(12) United States Patent
Park et al.

(10) Patent No.: US 7,275,479 B2
(45) Date of Patent: Oct. 2, 2007

(54) BREAD MAKER

(76) Inventors: Jae-ryong Park, Jugong Apt. #401-1603, 1048-2, Youngtong-dong, Paldal-ku, Suwon city, Kyungki-do (KR); Yong-hyun Kwon, Daewoo Apt. #301-203, Youngtong-dong, Paldal-ku, Suwon city, Kyungki-do (KR); Chul Kim, Kummaeul Apt. #607-404, Pyounochon-dong, Dongan-ku, Anyang city, Kyungki-do (KR); Tae-uk Lee, Daesung villa #201, Jowon-dong, Changan-ku, Suwon city, Kyungki-do (KR); Han-jun Sung, Jugong Apt. #909-202, 970-3, Youngtong-dong, Paldal-ku, Suwon city, Kyungki-do (KR); Jang-woo Lee, #201, 111-101, Maetan-2dong, Paldal-ku, Suwon city, Kyungki-do (KR); Dong-bin Lim, Jugong Apt. #914-1103, 970-3, Youngtong-dong, Paldal-ku, Suwon city, Kyungki-do (KR)

( * ) Notice: Subject to any disclaimer, the term of this patent is extended or adjusted under 35 U.S.C. 154(b) by 336 days.

(21) Appl. No.: 10/738,206

(22) Filed: Dec. 18, 2003

(65) Prior Publication Data

US 2004/0261627 A1    Dec. 30, 2004

(30) Foreign Application Priority Data

May 7, 2003    (KR) ...................... 10-2003-0029126

(51) Int. Cl.
*A47J 37/00*    (2006.01)
*A23L 1/00*    (2006.01)

(52) U.S. Cl. ........................... 99/348; 99/353; 126/190

(58) Field of Classification Search .................. 99/348, 99/353, 383, 367, 410, 415, 467; 126/190, 126/198, 273 R, 275 R, 275 E, 273 A
See application file for complete search history.

(56) References Cited

U.S. PATENT DOCUMENTS 4,080,524 A * 3/1978 Greenfield et al. ......... 219/729

(Continued)

FOREIGN PATENT DOCUMENTS

EP    1 357 504    10/2003

(Continued)

*Primary Examiner*—Reginald L. Alexander
(74) *Attorney, Agent, or Firm*—Staas & Halsey LLP

(57) ABSTRACT

A bread maker having a main body, an oven accommodated in the main body, a baking tray provided inside the oven, and a door rotatably connected to the main body to open and close the oven, the bread maker including a sealing part on an inside of the door to prevent leakage of heat from the oven, and a rib extending from the baking tray to contact the sealing part. The sealing part of the door contacts a rib formed on the baking tray when the door is closed so that the sealing part does not protrude into the oven, which prevents the sealing part from being damaged or deformed by an external force, and allows the door to be manufactured using a simple assembling process that increases productivity. The bottom of the oven includes a protuberant part that minimizes the effects of an external force.

5 Claims, 4 Drawing Sheets

U.S. PATENT DOCUMENTS

| | | | |
|---|---|---|---|
| 4,796,600 A * | 1/1989 | Hurley et al. | 126/273 A |
| 5,860,357 A * | 1/1999 | Yung et al. | 99/348 |
| 5,947,009 A | 9/1999 | Hedenberg | |
| 6,047,632 A * | 4/2000 | Bouffay et al. | 99/403 |
| 6,870,136 B1 * | 3/2005 | Majordy | 219/400 |
| 2004/0221737 A1 | 3/2004 | Park et al. | |

FOREIGN PATENT DOCUMENTS

| | | |
|---|---|---|
| JP | 2001-523444 | 11/2001 |
| KR | 2001-32188 | 4/2001 |
| WO | WO99/25467 | 5/1999 |

\* cited by examiner

BREAD MAKER

CROSS-REFERENCE TO RELATED APPLICATIONS

This application claims the benefit of Korean Patent Application No. 2003-29126, filed May 7, 2003, in the Korean Intellectual Property Office, the disclosure of which is incorporated herein by reference.

BACKGROUND OF THE INVENTION

1. Field of the Invention

The present invention relates to a bread maker, and, more particularly, to a bread maker having an improved oven sealing structure.

2. Description of the Related Art

Bread is food made from flour or meal mixed with yeast, water, salt, etc. The bread ingredients are kneaded, leavened, and baked. However, the process of making bread can be complicated and difficult for the average person to personally make bread at home.

Therefore, there has been developed a bread maker that allows a user to easily and conveniently make bread, which automatically performs a chain of processes, such as kneading, leavening, and baking.

Generally, a conventional bread maker includes a main body having an oven compartment, an oven accommodated in the oven compartment, a baking tray provided inside the oven, and a door attached to the main body to open and close the oven compartment.

In the conventional bread maker, the door has a sealing member that protrudes into the oven to contact a sealing contact part provided in a bottom center of the baking tray when the door is closed, thereby making assembly of the door complicated and less productive.

Further, the sealing member is likely to be damaged or deformed by an externally applied force.

SUMMARY OF THE INVENTION

It is an aspect of the present invention to provide a bread maker having an improved sealing structure, so that a door of the bread maker may be manufactured using a simple assembling process to increase productivity.

Additional aspects and/or advantages of the invention will be set forth in part in the description that follows and, in part, will be obvious from the description, or may be learned by practice of the invention.

To achieve the above and/or other aspects of the present invention, there is provided a bread maker having a main body, an oven accommodated in the main body, a baking tray provided inside the oven, and a door rotatably connected to the main body to open and close the oven, the bread maker including a sealing part on an inside of the door to prevent leakage of heat from the oven; and a rib extending from a bottom of the baking tray to contact the sealing part.

The rib is formed on a bottom edge of the baking tray, without the sealing part protruding into the oven.

A protuberant part is formed on a bottom of the oven adjacent to an edge of the baking tray opposite the sealing part to minimize an impact of an external force.

To achieve the above and/or other aspects according to the present invention, there is provided a baking tray for a bread maker having a main body, an oven within the main body, a door rotatably connected to the main body to open and close the oven, and a sealing part on an inside of the door, the baking tray including a rib extending from a bottom of the baking tray along a side of the baking tray adjacent to the door, the sealing part contacting the rib when the door is closed to prevent leakage of heat from the oven.

To achieve the above and/or other aspects according to the present invention, there is provided a door for a bread maker having a main body, an oven within the main body, a baking tray, and a rib extending from a bottom of the baking tray along a side of the baking tray adjacent to the door, the door including a sealing part on an inside of the door that contacts the rib when the door is closed to prevent leakage of heat from the oven, without the sealing part protruding into the oven to contact a center of the bottom of the baking tray.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENT

Figure 1:
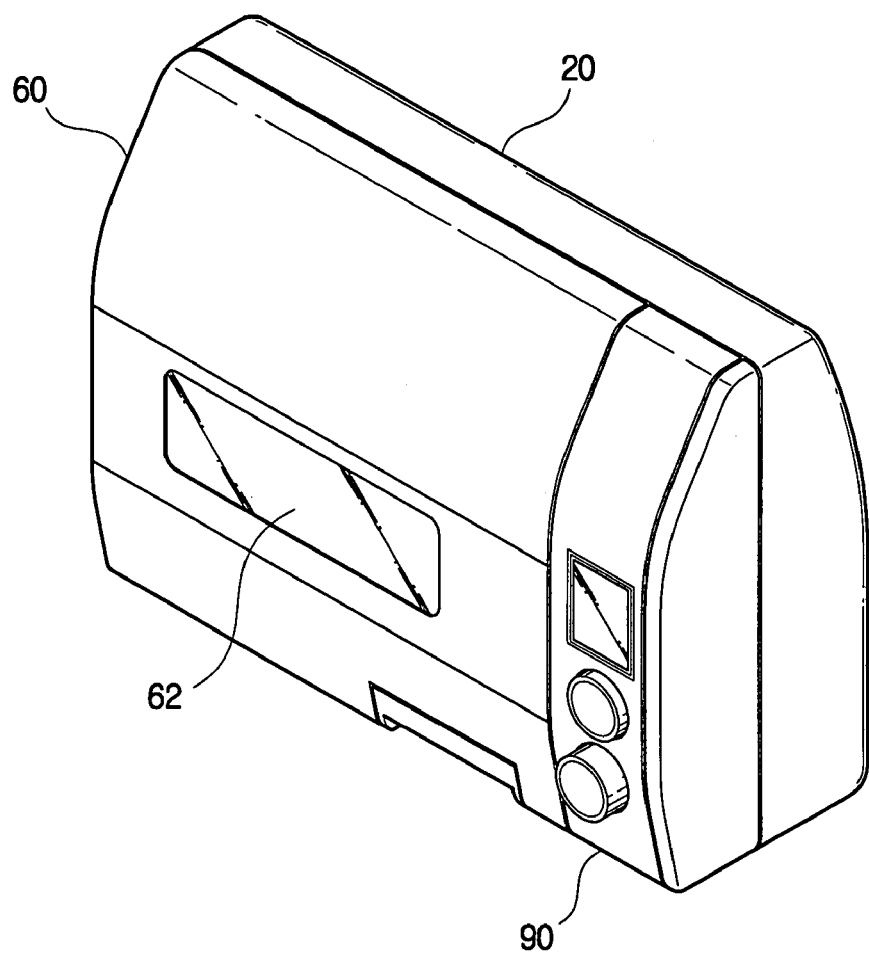
FIG. 1 is a perspective view of a bread maker according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein. Rather, this embodiment is provided so that the present disclosure will be thorough and complete, and will fully convey the concept of the invention to those skilled in the art.

Figure 2:
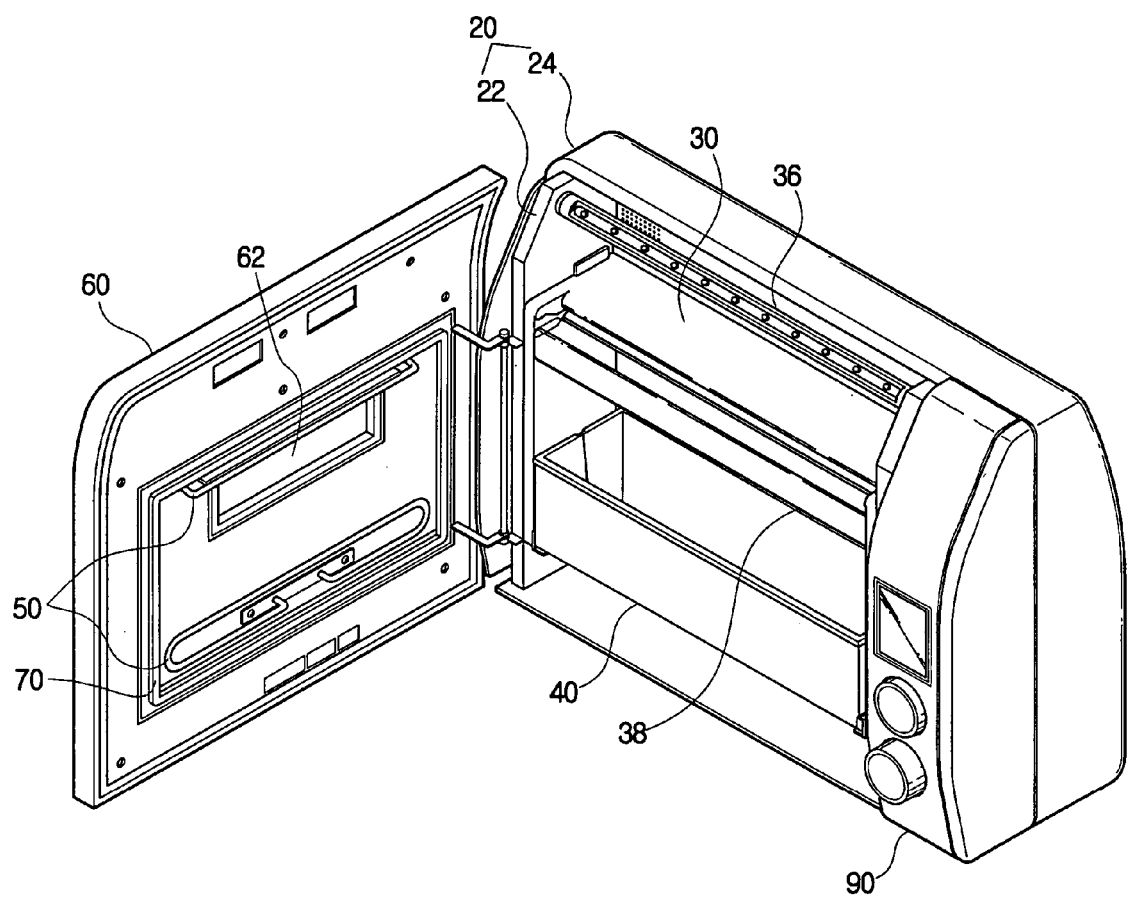
FIG. 2 is a perspective view of the bread maker of FIG. 1, with a door opened.

As shown in FIGS. 1 and 2, a bread maker according to an embodiment of the present invention includes a main body 20, an oven 30 accommodated in the main body 20, a baking tray 40 provided inside the oven 30, a plurality of heaters 50 to heat the inside of the oven 30, and a door 60 provided in the front of the main body 20 to open and close the oven 30.

The main body 20 includes a frame 22 forming an oven compartment in which the oven 30 is accommodated, a frame cover 24 covering the outside of the frame 22, and a control panel 90 provided in a front side of the main body 20 to allow a user to control the bread maker and to view an operating state of the bread maker.

In upper and lower sides of the oven 30 are provided an upper kneading drum 36 and a lower kneading drum (not shown), which are disposed in parallel and alternate between clockwise and counterclockwise rotations. On the upper kneading drum 36 and the lower kneading drum are respectively wound opposite ends of a mixing bag (not shown) filled with ingredients for the bread. Between the upper kneading drum 36 and the lower kneading drum is provided a pair of dough-blocking members 38 to prevent dough that is being kneaded in the mixing bag from moving toward the upper kneading drum 36.

The baking tray 40 is shaped like a box with a top opening to contain the completely kneaded dough. The baking tray 40 is made, for example, of aluminum or steel, which both have good heat-resistant properties.

The heaters 50 are respectively disposed in upper and lower parts of the door 60 and in upper and lower parts (not shown) of the inside of the oven 30 to heat the inside of the oven 30.

The door 60 is rotatably connected to the main body 20 so as to selectively open and close a front opening of the oven 30, and includes a sealing part 70 sealing the oven 30 to prevent leakage of heat from the oven 30.

The door 60 also includes a window glass 62 allowing a user to view the inside of the oven 30 even if the door 60 is closed.

Figure 3:
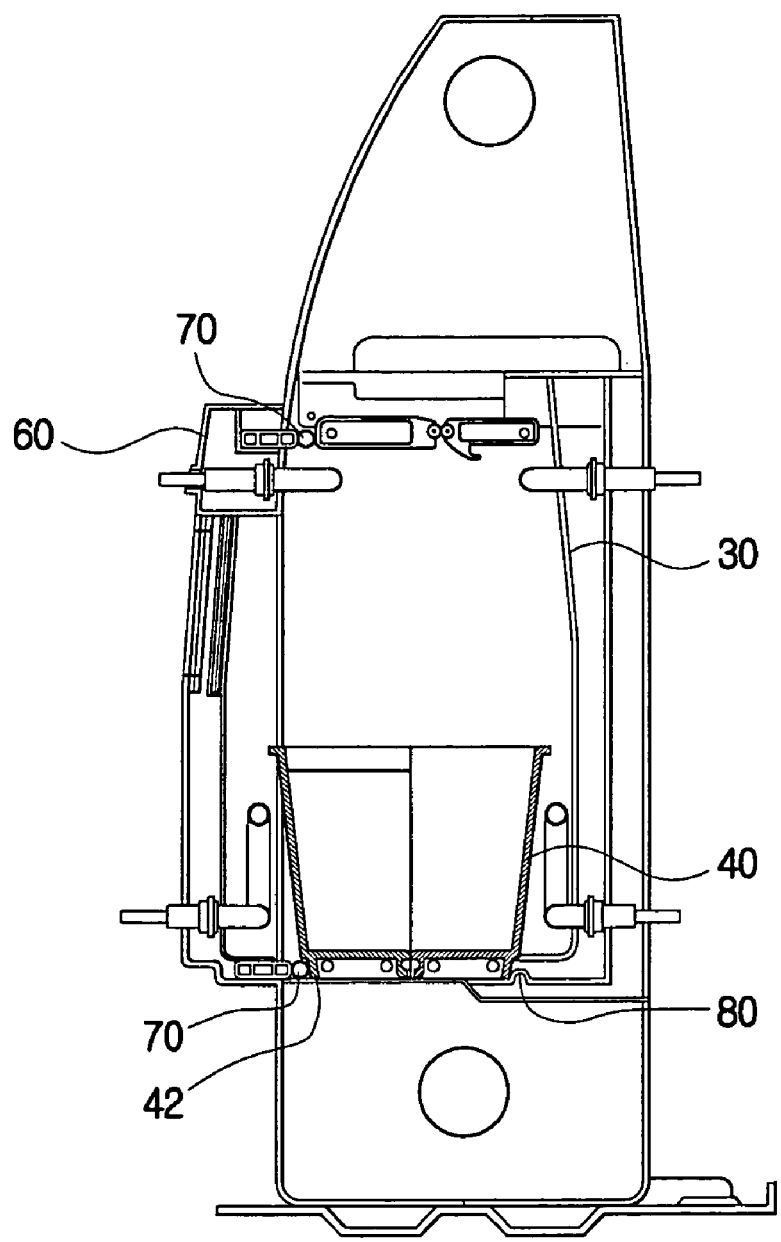
FIG. 3 is a sectional view illustrating a combined structure of an oven and the door in the bread maker of FIG. 2.
Figure 4:
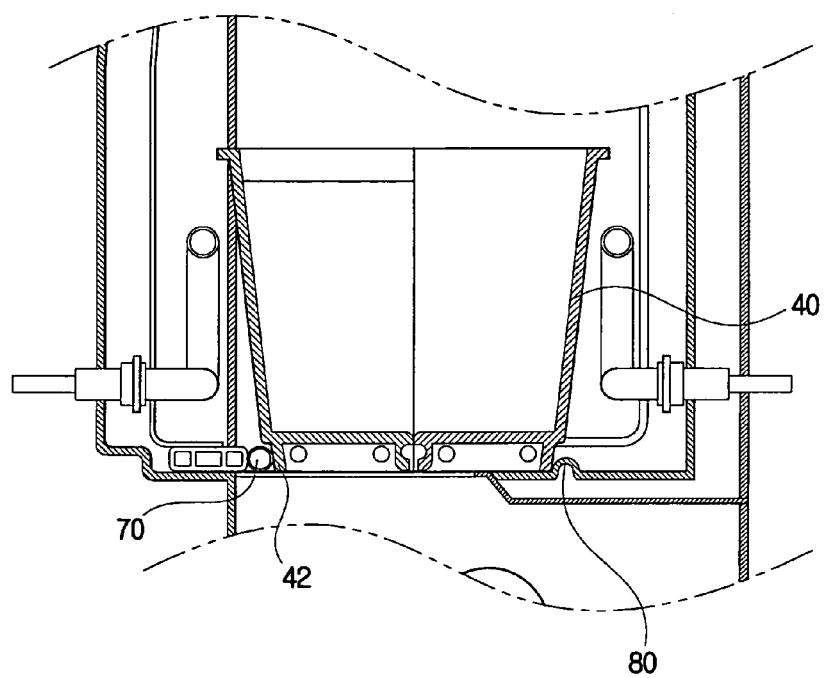
FIG. 4 is an enlarged sectional view illustrating an oven sealing structure in the bread maker of FIG. 3.

As shown in FIGS. 3 and 4, on an inner surface of the door 60 is provided the sealing part 70 to prevent leakage of heat between the oven 30 and the door 60, and in a bottom edge of the baking tray 40 is provided a rib 42 extending downward to contact the sealing part 70.

The rib 42 is formed in the bottom edge of the baking tray 40, and contacts the sealing part 70 when the door 60 is closed. Accordingly, the sealing part 70 does not need to protrude into the oven, thereby improving assembly of the door 60, productivity, and leakage prevention. The rib 42 can have various shapes as necessary.

Additionally, on a bottom of the oven 30 adjacent to a back edge of the baking tray 40 is a protuberant part 80 to minimize the influence of an external force, thereby further enhancing sealing efficiency.

As described above, the present invention provides a bread maker having an improved sealing structure in which a sealing part of a door contacts a rib formed in a bottom edge of a baking tray when the door is closed, so that the sealing part does not need to protrude into the oven. Accordingly, the sealing part is not damaged or deformed by an externally applied force, and the door is manufactured using a simple assembling process that increases productivity.

Further, on a bottom of an oven is formed a protuberant part to minimize the impact of the external force.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A bread maker having a main body, an oven accommodated in the main body, a baking tray provided inside the oven, and a door rotatably connected to the main body to open and close the oven, the bread maker comprising:

a plurality of heaters on an inside of the door, to heat the oven;

a sealing part on the inside of the door to prevent leakage of heat from the oven, wherein the sealing part encircles the plurality of heaters; and a rib extending from the baking tray to contact the sealing part such that the sealing part does not protrude into the oven to contact a center of a bottom of the baking tray.

2. The bread maker according to claim 1, wherein the rib is formed on a bottom edge of the baking tray.

3. The bread maker according to claim 1, further comprising a protuberant part formed on a bottom of the oven adjacent to a rear edge of the baking tray opposite the sealing part to minimize an impact of an external force.

4. A baking tray for a bread maker having a main body, an oven within the main body, a door rotatably connected to the main body to open and close the oven, a plurality of heaters on an inside of the door, to heat the oven, and a sealing part on the inside of the door, the baking tray comprising a rib extending from a bottom of the baking tray along a side of the baking tray adjacent to the door, the sealing part encircling the plurality of heaters and contacting the rib when the door is closed such that the sealing part does not protrude into the oven to contact a center of the bottom of the baking tray, to prevent leakage of heat from the oven.

5. A door for a bread maker having a main body, an oven within the main body, a baking tray, and a rib extending from a bottom of the baking tray along a side of the baking tray adjacent to the door, the door comprising a plurality of heaters on an inside of the door, to heat the oven, a sealing part on the inside of the door which encircles the plurality of heaters and contacts the rib when the door is closed to prevent leakage of heat from the oven, without the sealing part protruding into the oven to contact a center of the baking tray.

* * * * *

UNITED STATES PATENT AND TRADEMARK OFFICE
CERTIFICATE OF CORRECTION

| | |
|---|---|
| PATENT NO. | : 7,275,479 B2 |
| APPLICATION NO. | : 10/738206 |
| DATED | : October 2, 2007 |
| INVENTOR(S) | : Park et al. |

It is certified that error appears in the above-identified patent and that said Letters Patent is hereby corrected as shown below:

Title Page, Column 1 (Inventors), Line 8, change "Pyounochon" to --Pyoungchon--.

Signed and Sealed this

Eighth Day of April, 2008

JON W. DUDAS
*Director of the United States Patent and Trademark Office*